United States Patent [19]
Goto

[11] Patent Number: 5,365,503
[45] Date of Patent: Nov. 15, 1994

[54] DIGITAL RECORDING AND REPRODUCING APPARATUS

[75] Inventor: Soju Goto, Hino, Japan

[73] Assignee: Kabushiki Kaisha Kenwood, Tokyo, Japan

[21] Appl. No.: 7,974

[22] Filed: Jan. 22, 1993

[30] Foreign Application Priority Data

Jan. 24, 1992 [JP] Japan ................... 4-034188

[51] Int. Cl.$^5$ ............................ G11B 7/085
[52] U.S. Cl. ........................ 369/32; 369/48
[58] Field of Search ............. 369/32, 33, 48, 54, 369/59, 124, 84, 83; 360/15, 10.1, 13, 11.1

[56] References Cited
U.S. PATENT DOCUMENTS

| 4,410,917 | 10/1983 | Newdoll et al. | 360/15 |
| 5,134,598 | 7/1992 | Nagano | 369/32 |
| 5,233,477 | 8/1993 | Scheffler | 360/15 |
| 5,243,588 | 9/1993 | Maeda et al. | 369/60 |

Primary Examiner—Benny Lee
Assistant Examiner—Tan Dinh
Attorney, Agent, or Firm—Sixbey, Friedman, Leedom & Ferguson

[57] ABSTRACT

Cue and review functions are provided sufficiently for a digital recording and reproducing apparatus having a speed of reading information recorded in a recording medium faster than that of converting the read data into analog signals. A buffer memory is provided with has a capacity allowing to produce sounds for a sufficient time period. The following operations are repetitively performed during the cue or review operation. When one of a cue and review is issued, the contents of the buffer memory is cleared, the read position of the recording medium is then jumped from the present read position to a new read position remote from the present read position by a predetermined amount, data of a predetermined amount is thereafter read starting from the new read position and written in the buffer memory, when the data in the buffer memory is converted into an analog signal and the buffer memory becomes empty, the read position of the recording medium is jumped from the last read position in a predetermined direction and by a predetermined amount and data of a predetermined amount is read starting from the other new read position.

4 Claims, 5 Drawing Sheets

DIGITAL RECORDING AND REPRODUCING APPARATUS

BACKGROUND OF THE INVENTION

1. Field of the Invention

The present invention relates to a digital recording and reproducing apparatus such as digital analog tape recorders and optical disk recording and reproducing apparatuses. More particularly, the present invention relates to a digital recording and reproducing apparatus capable of performing a que (high speed normal with sounds) and review (high speed reverse with sounds) operations.

2. Description of the Related Art

In a conventional digital recording and reproducing apparatus such as an optical disk recorder (CD-R) shown in FIG. 3, information recorded in a recording medium 1 (optical disk) is read by a data read circuit 2 controlled by a microcomputer 6, and supplied to a D/A converter 4 to convert it into analog signals.

The microcomputer 6 operates in accordance with a program written in its ROM or operates in response to a signal supplied from a key matrix 7.

Such an optical disk apparatus has the same data rate of reading information recorded in the recording medium or optical disk and converting it into analog signals. Therefore, a buffer memory is not necessary. When a cue or review is issued from the key matrix 7, the information read position is jumped from the present track to a track remote from the present track by a predetermined number of tracks, and data is read starting from the new track for a predetermined time period and converted into analog signals. These operations are repeated.

In the case of a digital audio tape recorder (DAT), data read at a speed faster than that of analog signal conversion is temporarily stored in a buffer memory and thereafter converted into analog signals.

When a cue or review is instructed to such a DAT, the tape is wound or rewound at a speed faster than that of sound reproduction, and correct data of the read data is converted into analog signals.

However, in this case, the capacity of the buffer memory is small in the order of about one sector, being unable to output sounds for a sufficient time period.

The present invention has been made to solve the above-described problem, and aims at realizing sufficient cue and review functions for a digital recording and reproducing apparatus having a speed of reading information recorded in a recording medium faster than that of converting the read data into analog signals.

SUMMARY OF THE INVENTION

According to one aspect of the present invention, there is provided a digital recording and reproducing apparatus having a speed of reading information recorded in a recording medium faster than that of converting the read data into an analog signal, comprising:
 a buffer memory for temporarily storing the read data before converting the read data into said analog signal, the buffer memory having a capacity allowing to produce sounds for a sufficient time period, wherein when one of a cue and review is issued, the contents of the buffer memory is cleared, the read position of the recording medium is then jumped from the present read position to a new read position remote from the present read position by a predetermined amount, data of a predetermined amount is thereafter read starting from the new read position and written in the buffer memory, when the data in the buffer memory is converted into an analog signal and the buffer memory becomes empty, the read position of the recording medium is jumped from the last read position in a predetermined direction and by a predetermined amount and data of a predetermined amount is read starting from the other new read position, the above operations of controlling the data read from the recording medium in accordance with the empty state of the buffer memory being repeated.

In the digital recording and reproducing apparatus, the target position of the jump when one of a cue and review is first issued is set to an address offset from an address of data recorded in the recording medium and reproduced when the one of a cue and review was issued.

According to the digital recording and reproducing apparatus of the present invention, data stored in the buffer memory having a capacity allowing to output sounds for a sufficient time period. It is therefore possible to output sounds for a sufficient time period during a cue or review operation.

Furthermore, the target position of the jump when one of a cue and review is first issued is set to an address offset from an address of data recorded in the recording medium and reproduced when the one of a cue and review was issued. Therefore, the position of reading data from the recording medium corresponds generally to the data to be outputted as sounds, achieving a necessary cue or review function.

DETAILED DESCRIPTION OF THE EMBODIMENT

Figure 1:
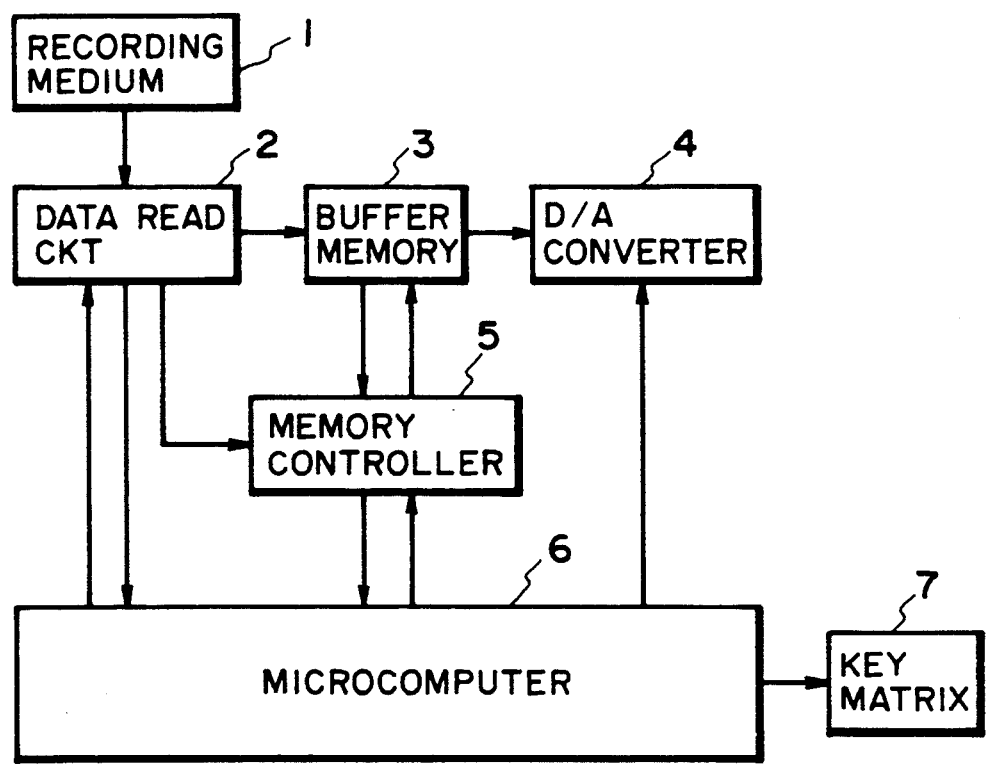
FIG. 1 is a block diagram showing the structure of a digital recording and reproducing apparatus according to an embodiment of the present invention.

An embodiment of a digital recording and reproducing apparatus of the present invention will be described with reference to the accompanying drawings. FIG. 1 is a block diagram showing the structure of the digital recording and reproducing apparatus according to an embodiment of the present invention.

A recording medium 1 is recorded with digital data modulated in a manner suitable for this recording medium. The modulation may be EFM for an optical disk and 8-10 conversion for a magnetic tape.

A data read circuit 2 is constituted by a controller for controlling a pickup which reads data from the recording medium 1 and controlling a mechanism, a demodulator for demodulating data read from the recording medium, a circuit for converting a data format and correcting errors, and a demodulator for demodulating control information added to the data.

The data read circuit 2 sends audio data to a buffer memory, control information added to the data to a memory controller 5, and address information and a signal representing the operation status of the mechanism to a microcomputer 6.

The buffer memory 3 stores data supplied from the data read circuit 2 at an address indicated by the memory controller 5, or sends data at an address indicated by the memory controller 5 to a D/A converter 4.

The D/A converter 4 converts digital data supplied from the buffer memory 3 into analog signals. The memory controller 5 generates an address of data to be stored in the buffer memory 3 and causes the buffer memory 3 to store the data, in response to a timing signal supplied from the data read circuit 2.

The memory controller 5 informs the microcomputer 6 the use status of the buffer memory 3, and sends a data conversion timing signal to the D/A converter 4. Under the control of the microcomputer 6, data in the buffer memory 3 is linked (consecutively coupled) to data supplied from the data read circuit 2.

The microcomputer 6 controls the data read circuit 2 and instructs a muting operation to the D/A converter, in accordance with a user instruction from a key matrix 7 and information from the memory controller 5.

The operation of the digital recording and reproducing apparatus constructed as above will be described. The data read circuit 2 reads data written in the recording medium 1, and demodulates the read data to send it to the buffer memory 3.

In response to a signal from the data read circuit 2, the memory controller 5 operates to make the buffer memory 3 store inputted data block, with the data block head being located at a predetermined address of the buffer memory 3. The memory controller 5 also operates to make the buffer memory 3 send data to the D/A converter 4 at a data conversion timing.

The data write speed of the buffer memory 3 (corresponding to the speed of reading data from the recording medium) is slower than that of converting the read data into analog signals at the D/A converter 4. Therefore, while the data read circuit 2 continues to read data, the number of empty or vacant addresses decreases gradually.

When the number of vacant addresses of the buffer memory 3 becomes insufficient, the memory controller 5 informs the microcomputer 6 such a status. The microcomputer 6 instructs the data read circuit 2 to stop reading data. During this stop period, data continues to be sent from the buffer memory 3 to the D/A converter 4 so that the number of vacant addresses of the buffer memory 3 increases gradually.

When the number of vacant addresses of the buffer memory 3 becomes sufficient, the memory controller 5 sends a write request to the microcomputer 6 which then instructs the data read circuit 2 to read data from the address next to the last read address. The microcomputer 6 also sends a data link instruction to the memory controller 5 to link the loaded data to the already loaded data within the buffer memory 3, to thereby resume data loading into the buffer memory 3. In the above manner, data in the recording medium 1 can be reproduced.

Figure 2A:
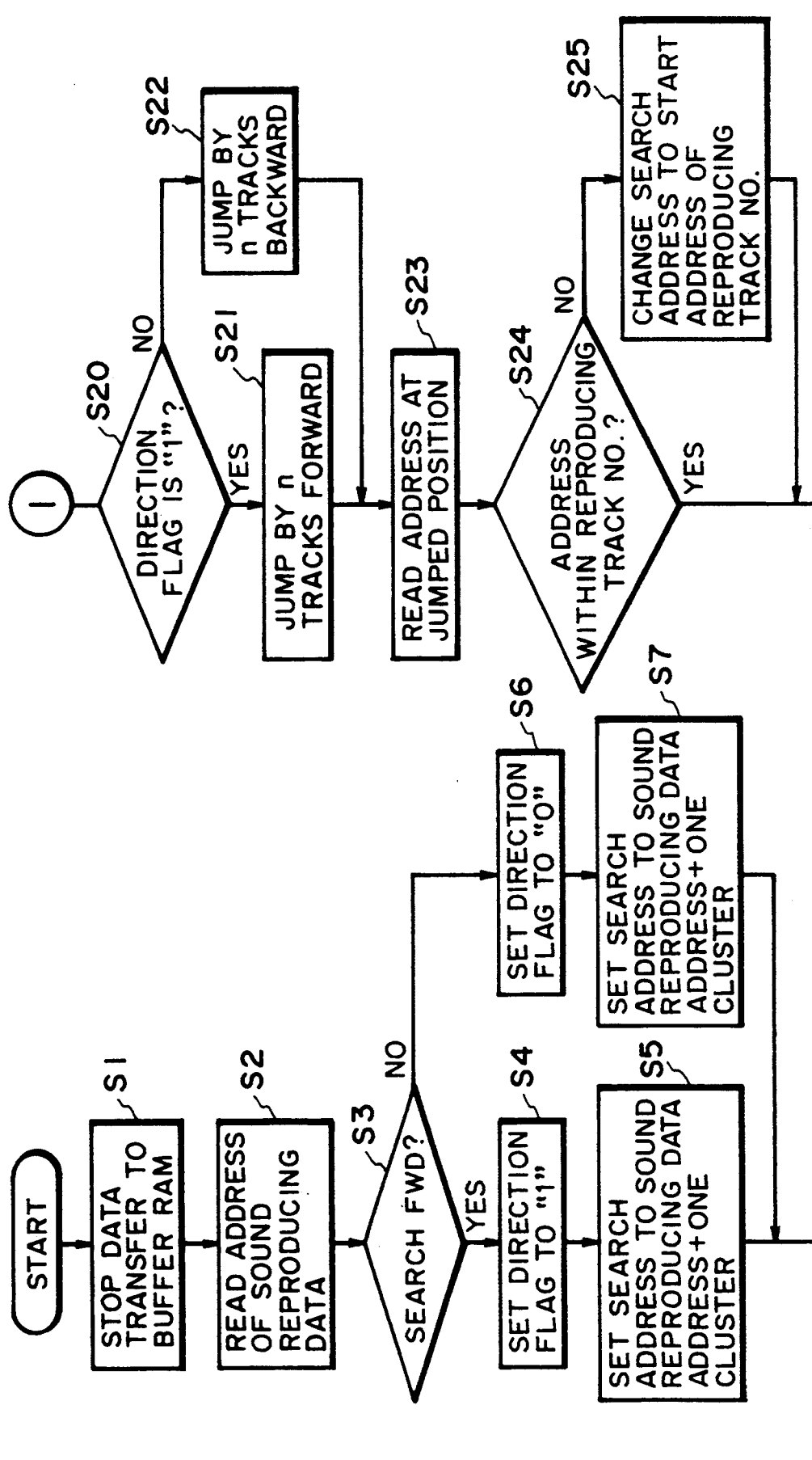
FIG. 2A, 2B and 2C illustrate a flow chart showing the cue and review operations of the digital recording and reproducing apparatus.
Figure 2B:
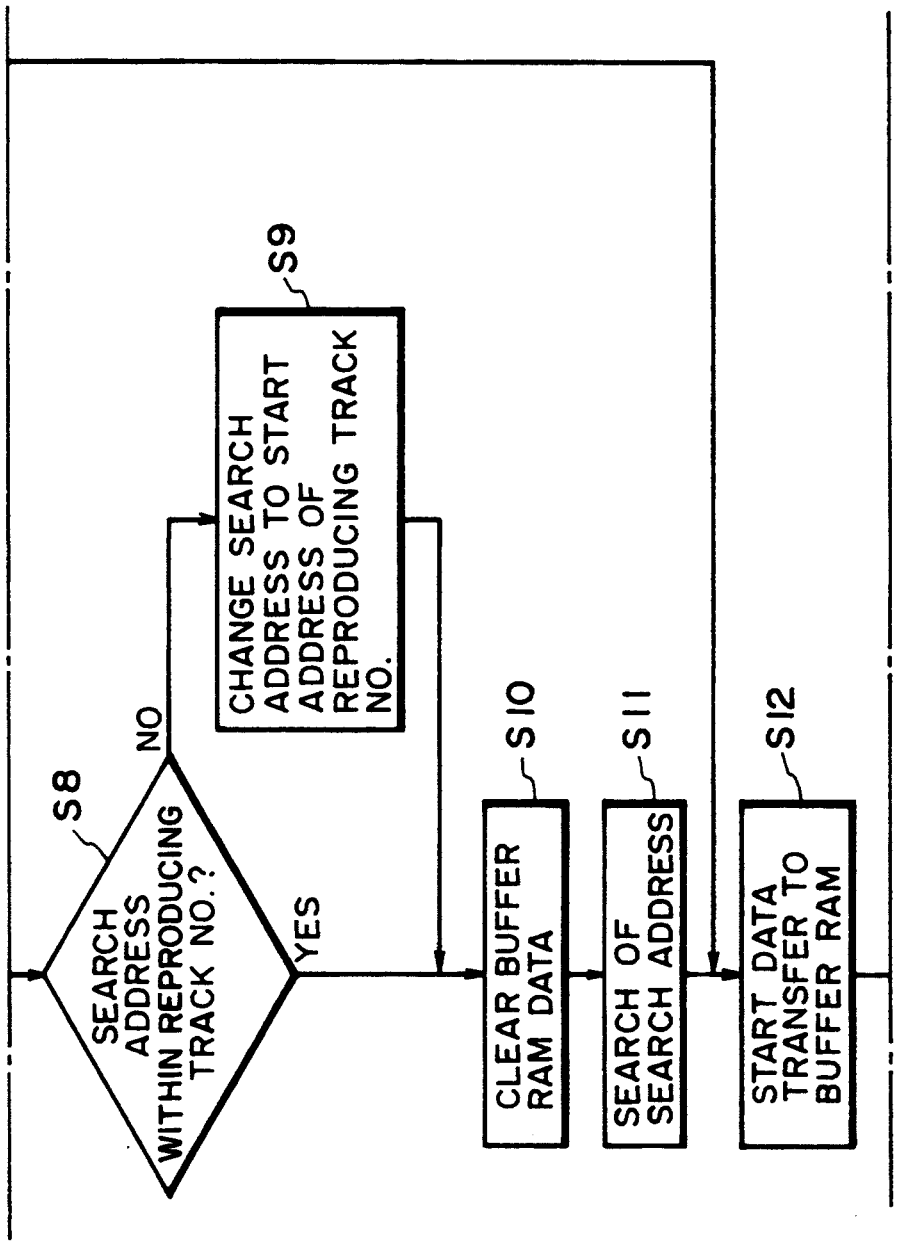
Figure 2:
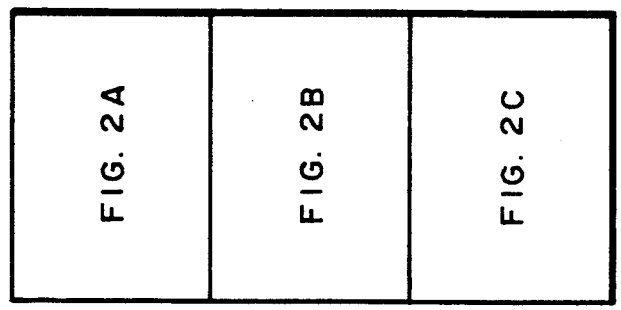
Figure 2C:
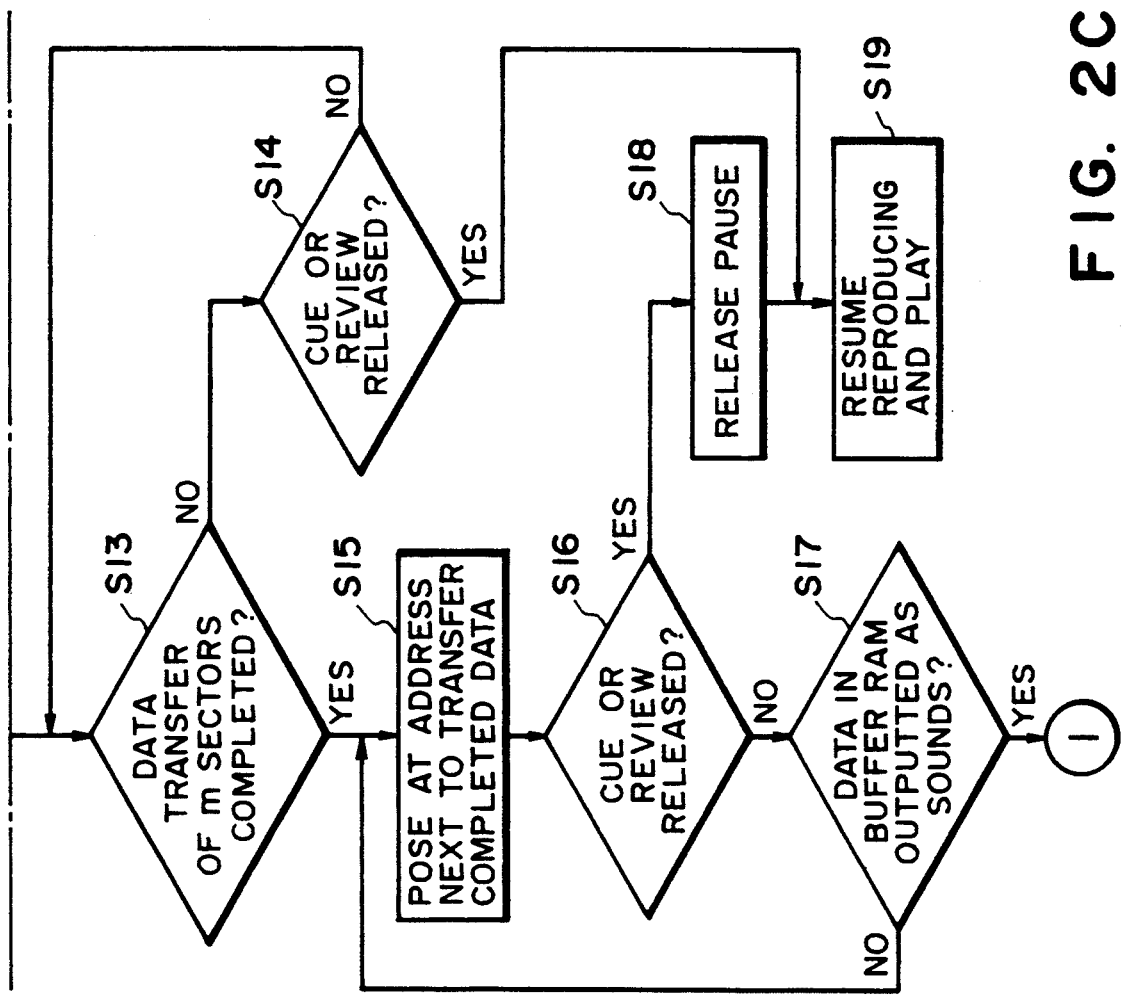
Figure 3:
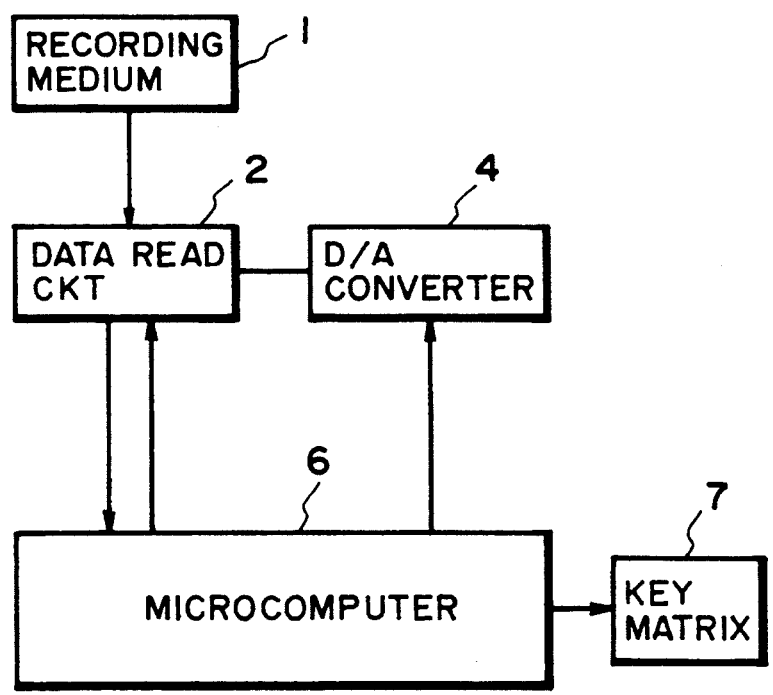
FIG. 3 is a block diagram showing the structure of a conventional digital recording and reproducing apparatus.

Next, the cue and review operations will be described with reference to the flow chart shown in FIG. 2. When a cue or review is issued from the key matrix 7, the microcomputer 6 instructs the data read circuit 2 to stop reading data, at step S1. At step S2, the address or absolute time, of data last converted into an analog signal at the D/A converter 4, on the recording medium 1, is checked.

At step S3, it is checked whether the search direction on the recording medium is in the forward or backward direction. The search direction is forward for a cue, and so the flow advances to step S4. The search direction is backward for a review, and so the flow advances to step S6.

A direction flag is set to "1" at step S4 to advance to step S5. At step S5, a search address is set to an address remote from the address checked at step S2 by one cluster (several ms) in the forward direction, to thereafter advance to step S8.

The direction flag is set to "0" at step S6 to advance to step S7. At step S7, the search address is set to an address remote from the address checked at step S2 by one cluster (several ms) in the backward direction, to thereafter advance to step S8.

It is checked at step S8 whether the set search address falls within the range of programmed reproducing addresses. If within this range, the flow advances to step S10, whereas if not, the flow advances to step S9 whereat the search address is changed to the start address of the reproducing track number to thereafter advance to step S10.

At step S10, data in the buffer memory. 3 is cleared. Next, at step S11 the search address is located. At step S12, data is read from the recording medium starting from the search address, and loaded in the buffer memory 3. The data in the buffer memory is then converted into analog signals to output sounds.

It is checked at step S13 whether data transfer of m sectors after the start of data read has been completed. If completed, the flow advances to step S15, and if not, the flow advances to step S14.

At step S14 it is checked whether the cue or review was released upon operation of the key matrix 7. If released, the flow advances to step S19 to allow the data reproducing operation. If not, the flow returns to step S13.

At step S15, the operation enters a pose state at the address next to the address from which data was read by the data read circuit 2, to thereafter advance to step S16.

At step S16 it is checked whether the cue or review was released upon operation of the key matrix 7. If released, the flow advances to step S18 to release the pose state. If not, the flow advances to step S17 whereat it is checked whether all data in the buffer memory 3 has been transformed into sounds and the buffer memory 3 is empty. If empty, the flow advances to step S20, and if not, the flow returns to step S15.

At step S20 it is checked whether the direction flag is "1". If "1", the flow advances to step S21, and if not, the flow advances to step S22.

At step S21, the data read position by the data read circuit 2 is jumped to a position in the forward direction by n tracks to advance to step S23. At step S22, the data read position by the data read circuit 2 is jumped to a position in the backward direction by n tracks to advance to step S23.

At step S23, the jumped address is read to thereafter advance to step S24 whereat it is checked whether the read address falls within the range of programmed reproducing addresses. If so, the flow moves to step S12, and if not, the flow advances to step S25 whereat the search address is changed to the start address of the reproducing track number, and this start address is located to thereafter move to step S12.

In the above manner, the cue and review operations are executed. Data is read from the address remote only by one cluster from the address of data of a reproduced sound immediately before the cue or review operation. Therefore, discontinuous transition from the reproducing operation to the cue or review operation does not occur, even for the large capacity of the buffer memory in the order of 2 to 3 sec.

Furthermore, it is possible to output sounds for a sufficient time period by increasing the capacity of the buffer memory.

According to the digital recording and reproducing apparatus of the present invention, even if the apparatus is of the type having a speed of reading information recorded in a recording medium faster than that of converting the read data into analog signals, discontinuous transition from the reproducing operation to the cue or review operation does not occur, and sounds can be outputted for a sufficient time period.

What is claimed is:

1. A digital recording and reproducing apparatus which includes a read unit (2) and D/A converter (4), the read unit having a speed of reading information recorded in a recording medium (1) faster than that of converting the read data into an analog signal in the D/A converter, comprising:

a buffer memory (3) interposed between the read unit and D/A converter for temporarily storing said read data before converting said read data into an analog signal, said buffer memory having a capacity allowing to produce sounds for a sufficient time period, and a control unit (5,6) for detecting, in response to a cue or review mode instruction, an address of data in the recording medium which is currently converted in the D/A converter, and controlling the read unit to read a predetermined amount of data at addresses in the recording medium which start an address forwardly or backwardly remoted from the detected address by a first predetermined distance and then repeatedly read the predetermined amount of data in the recording medium at addresses which starts an address jumped from the last read address in the previous read cycle by a second predetermined distance.

2. A digital recording and reproducing apparatus according to claim 1, wherein said first predetermined distance is one sector.

3. A digital recording and reproducing apparatus according to claim 1, wherein said control unit in response to the cue or review mode instruction clears the contents of the buffer memory.

4. A digital recording and reproducing apparatus according to claim 4, wherein said predetermined amount of data corresponds to a capacity of the buffer memory.

* * * * *